No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 1.
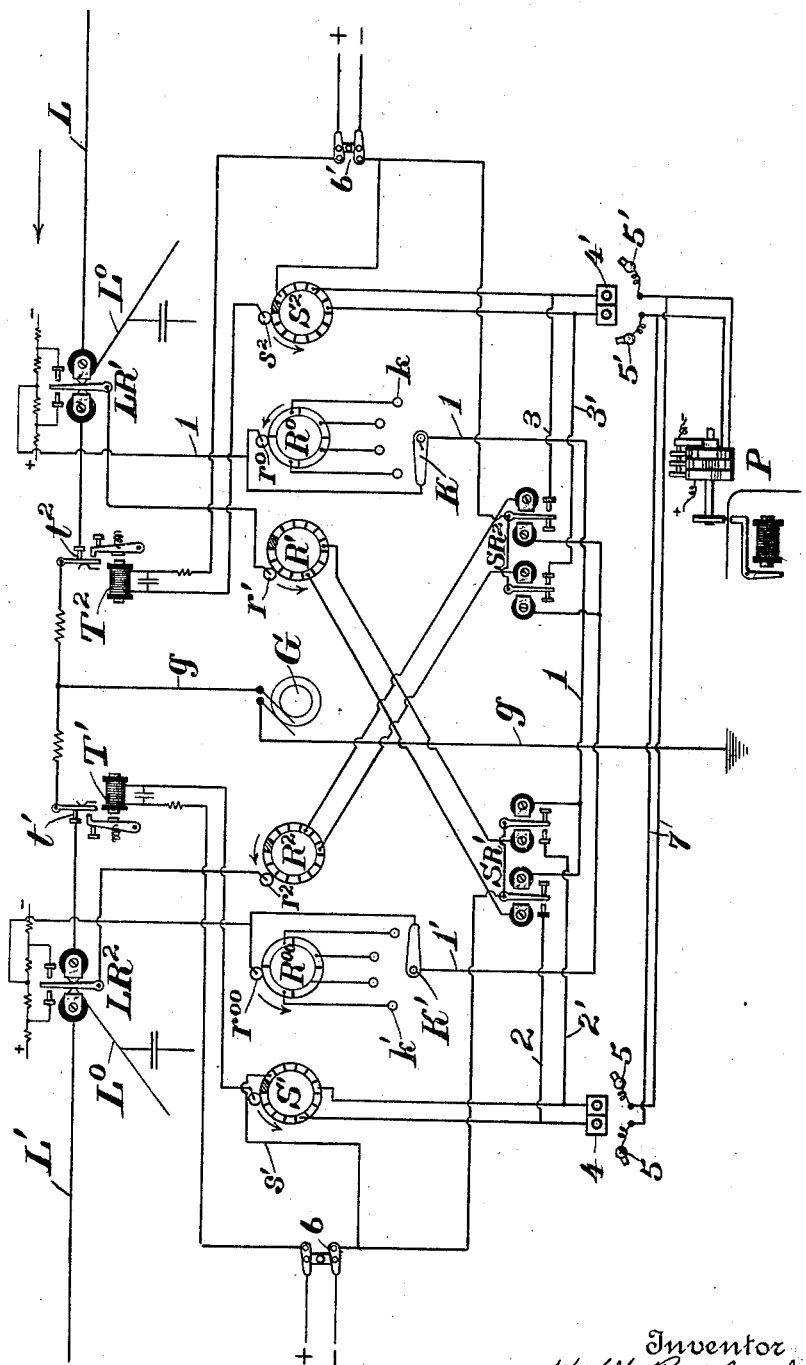

No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 2.
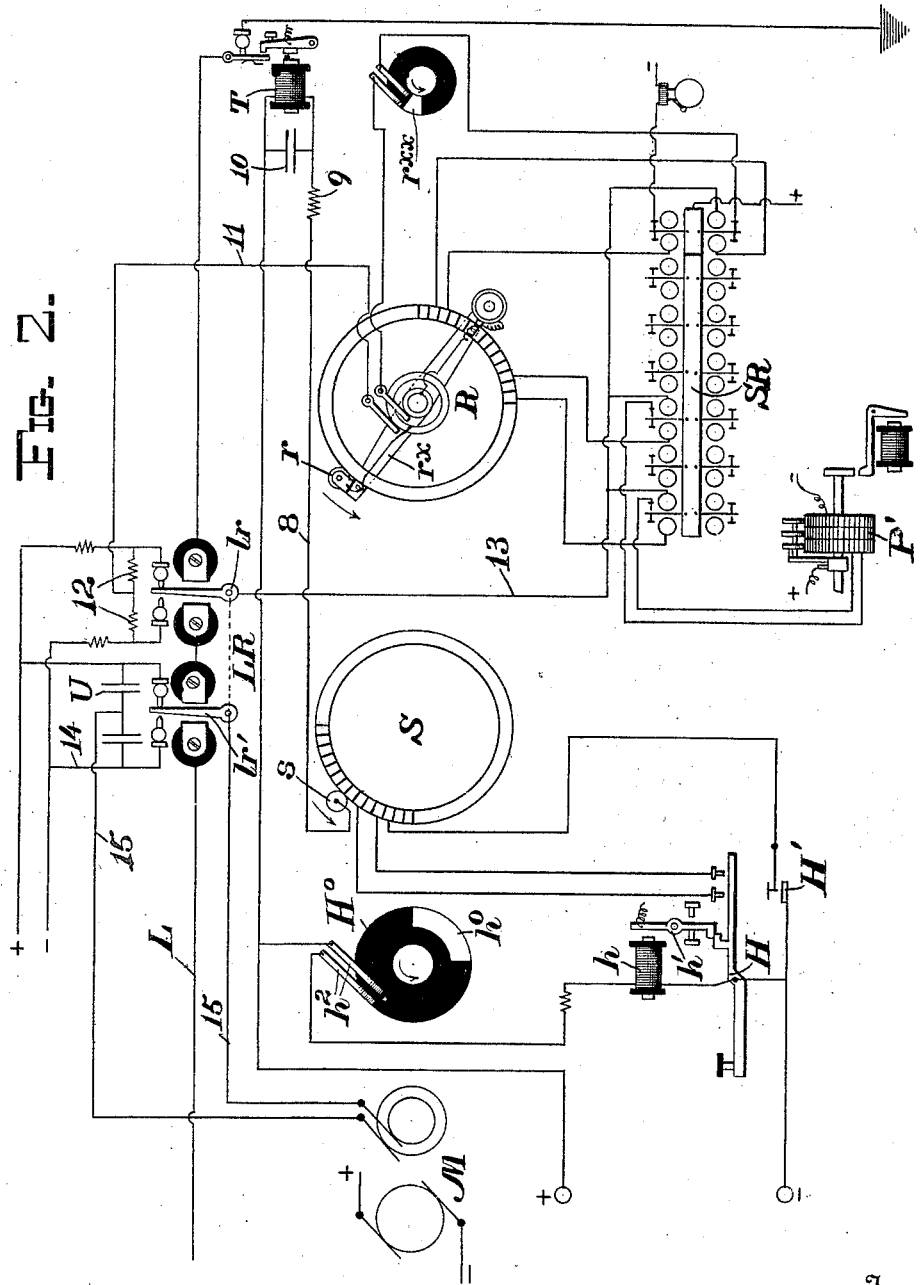

No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 3.
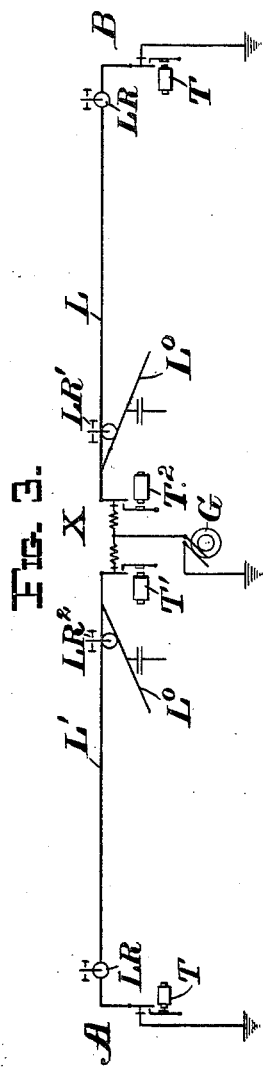
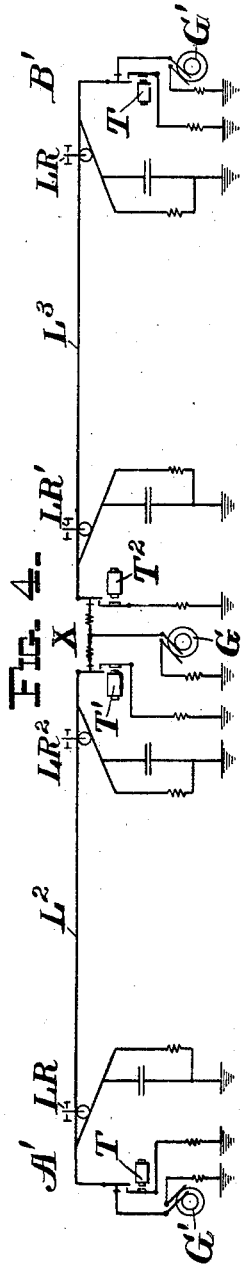
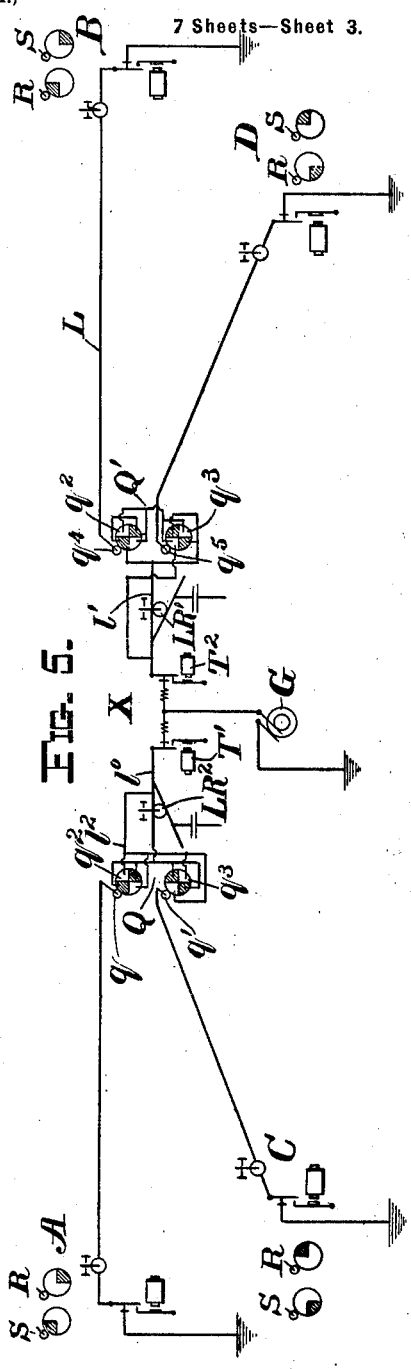
Witnesses
John H. Holt
Percy C. Bowen
Inventor
H. H. Rowland
Admx. of the estate of
H. A. Rowland, deceased
by Wilkinson & Fisher
Attorneys.
THE NORRIS PETERS CO., PHOTO-LITHO., WASHINGTON, D. C.

No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 4.
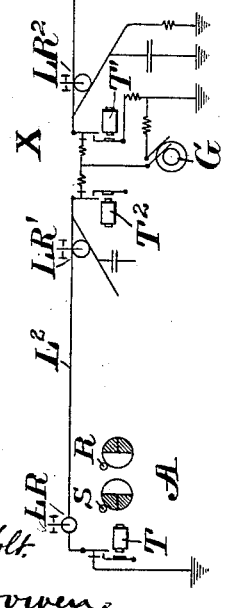
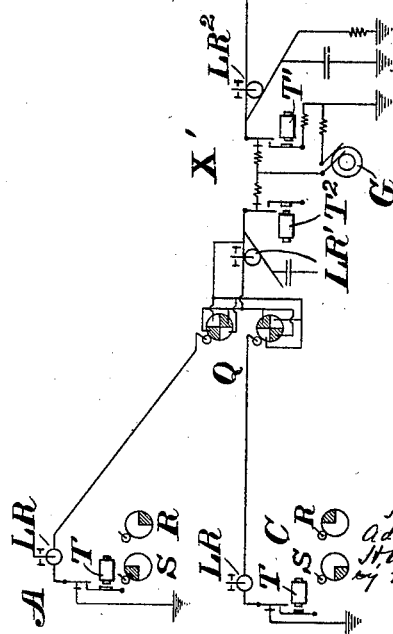

No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 5.
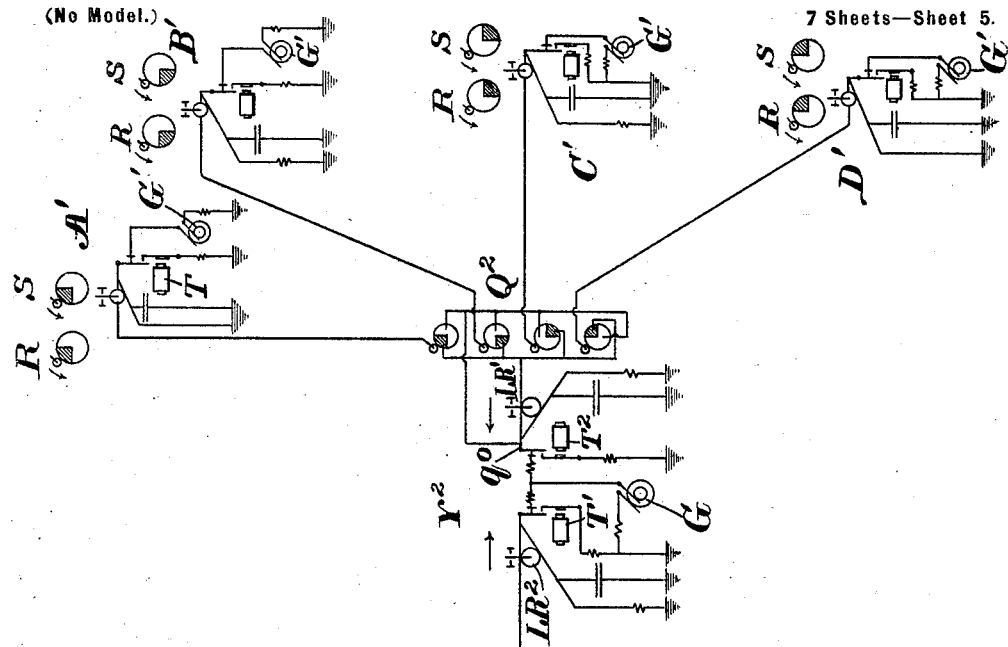
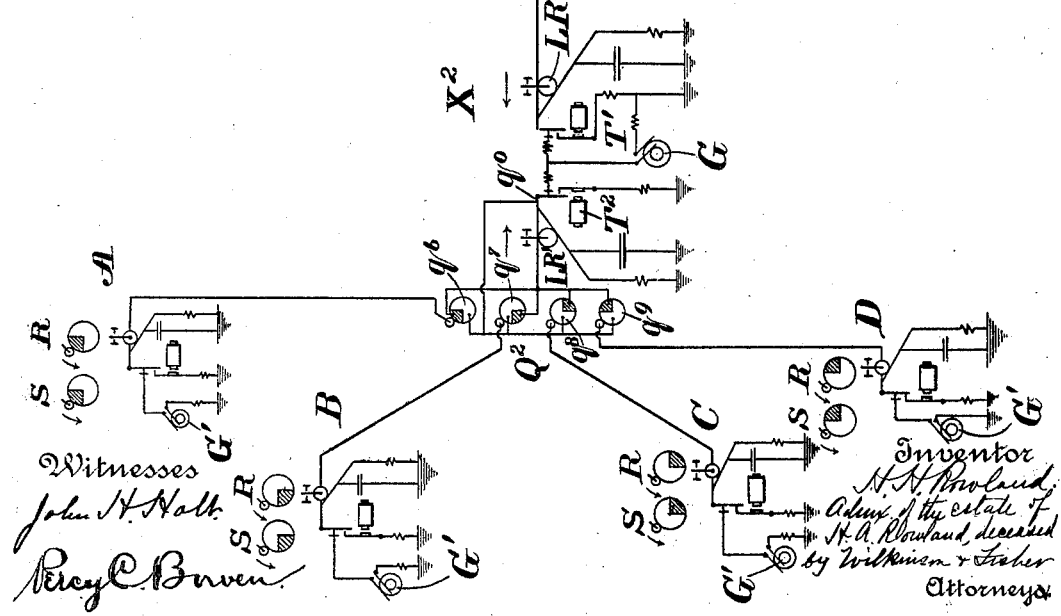
Fig. 8.
Witnesses
Inventor No. 699,574. Patented May 6, 1902.
H. A. ROWLAND, Dec'd.
H. H. ROWLAND, Administratrix.
TELEGRAPHIC DISTRIBUTION.
(Application filed July 24, 1901.)
(No Model.) 7 Sheets—Sheet 6.
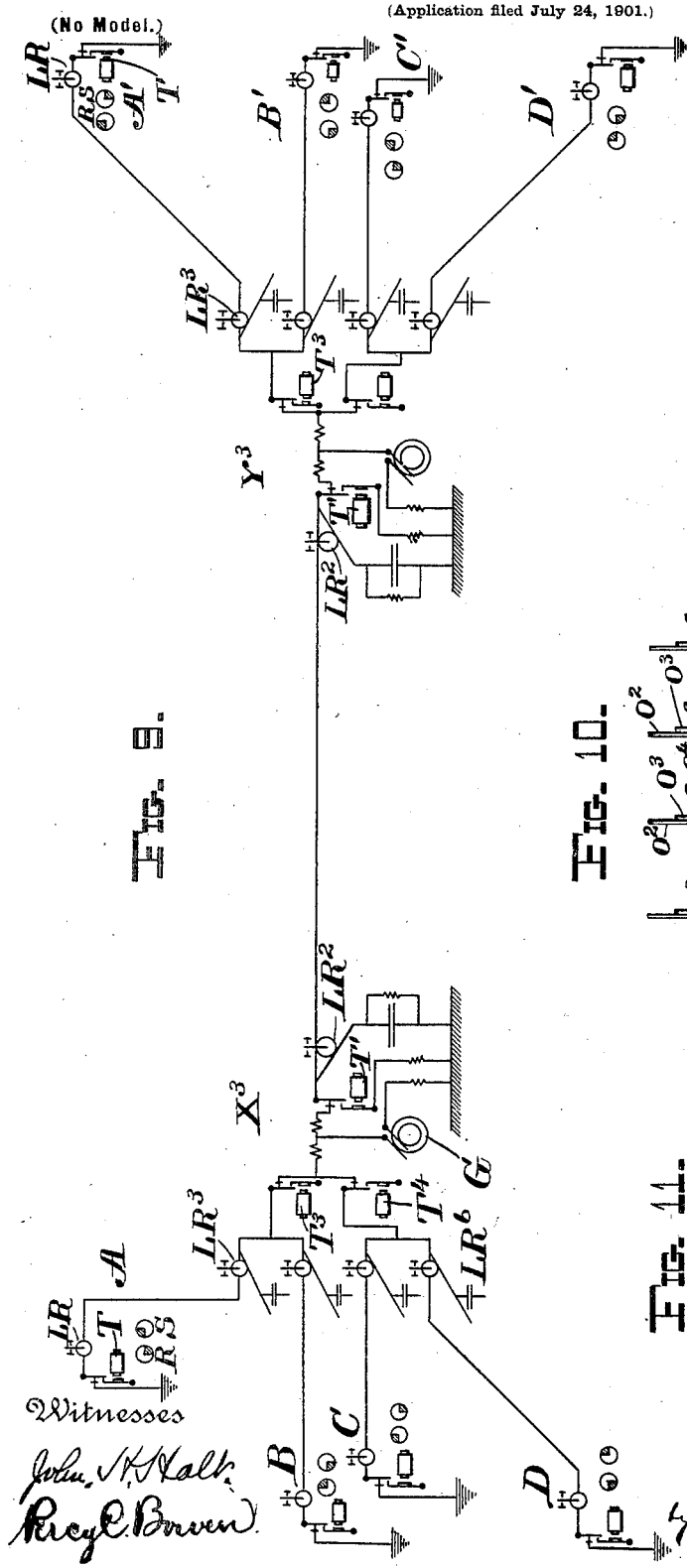
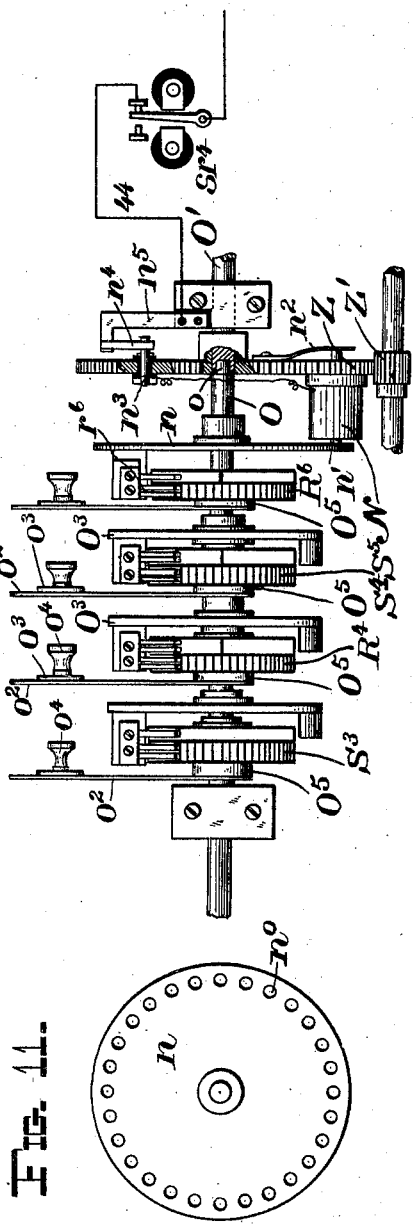
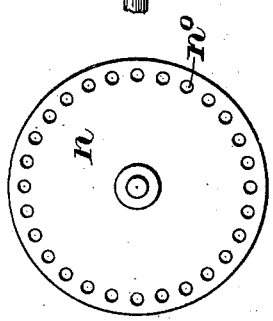

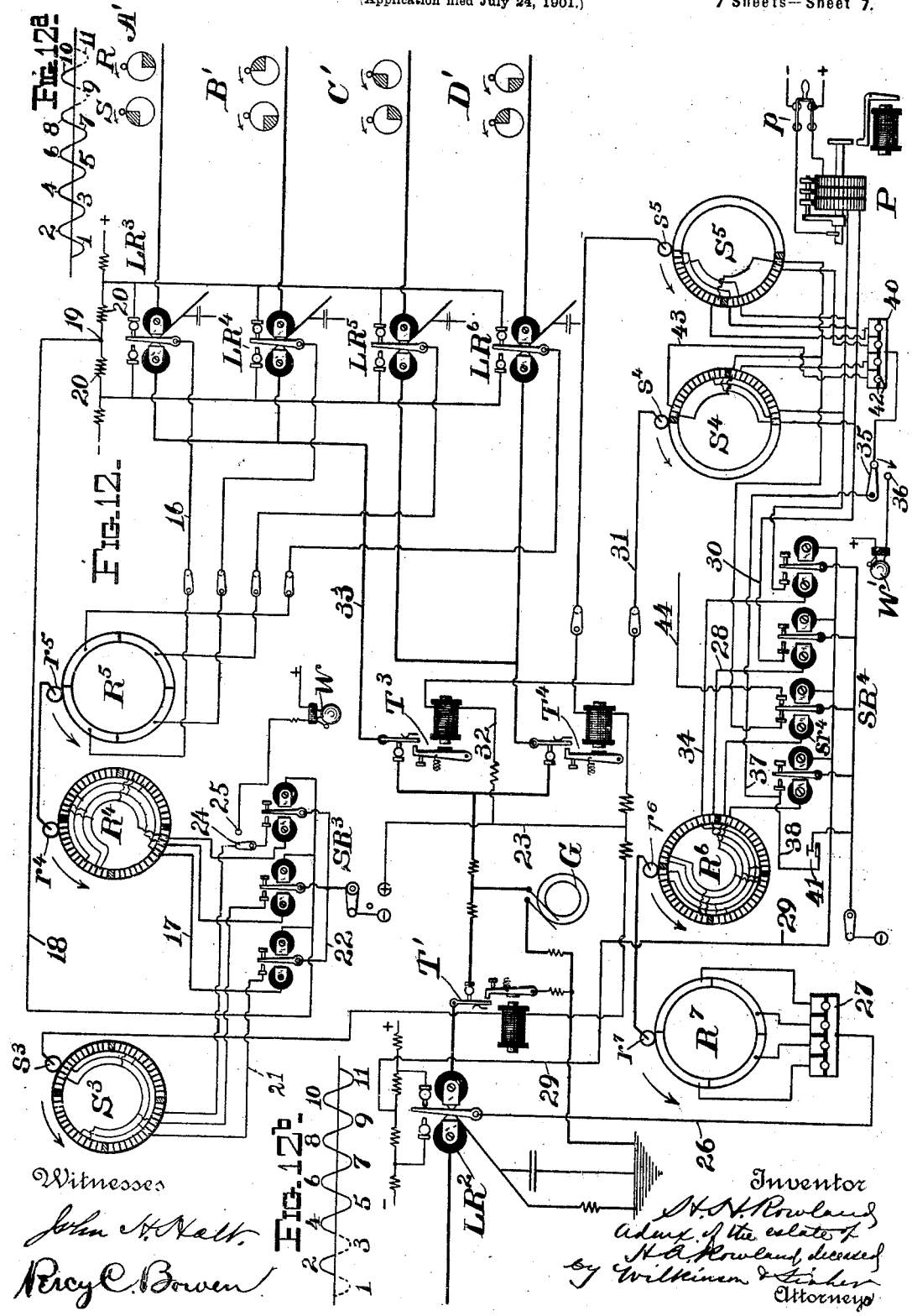

UNITED STATES PATENT OFFICE.

HENRIETTA H. ROWLAND, OF BALTIMORE, MARYLAND, ADMINISTRATRIX OF HENRY A. ROWLAND, DECEASED, ASSIGNOR TO ROWLAND TELEGRAPHIC COMPANY, OF BALTIMORE, MARYLAND, A CORPORATION OF NEW JERSEY.

TELEGRAPHIC DISTRIBUTION.

SPECIFICATION forming part of Letters Patent No. 699,574, dated May 6, 1902.

Application filed July 24, 1901. Serial No. 69,524. (No model.)

*To all whom it may concern:*

Be it known that HENRY A. ROWLAND, deceased, late a citizen of the United States, and a resident of Baltimore city, in the State of Maryland, did invent certain new and useful Improvements in Telegraphic Distribution, (Case J,) of which the following is a full, clear, and exact specification, such as will enable any one skilled in the art to manufacture and use the same.

This invention relates to improvements in systems of telegraphic intercommunication by means of alternating or other periodically-varying electric currents, and has for its object, first, the providing of means whereby telegraphic messages of the above character may be automatically transmitted or repeated through a central generating or dynamo station and the utilization of this feature for many purposes. For example, it enables us to double the length of a line in which the signaling-current is derived from a single source, such as a simplex line or a reflected-wave line, without employing an additional source of current by locating the source of current at a point intermediate between the sending and receiving points and transmitting the signals through the station at which said source of current is located. With this arrangement an operator in Boston, for example, can communicate over a reflected-wave line with an operator in Washington, notwithstanding the maximum length of such a line is ordinarily about three hundred miles. In such a case the central generating-station would preferably be located in New York. The term "reflected wave" is used to designate a particular form of telegraph-line by which messages may be transmitted long distances by locating the source of signaling-current at one end of the line only and depending upon the reflected action of the current, as hereinafter fully described.

Another application of the invention is the lengthening of duplex or octoplex lines—such, for example, as described in the patent application of Henry A. Rowland filed June 4, 1900, and serially numbered 19,070. These lines are themselves capable of carrying messages great distances—one thousand miles, for example—without relaying. This distance, however, may be doubled without employing but one extra source of signaling-current by allowing one end of two such lines to terminate in a central station, which will generate current for both lines and repeat the messages from one line to the other. Moreover, this feature of the invention may be employed in combining a reflected-wave or other line with a duplex or octoplex line, as hereinafter fully described.

This invention further consists in employing repeating-stations of the above character in the production of a substation or subscriber's telegraph system. This feature of the invention contemplates the collection of messages at a central station sent from a plurality of substations or subscribers and the automatic transmission of these messages through the central station over a trunk-line to another central station, where they are automatically redistributed to the proper substations or subscribers. In this manner a plurality of subscribers located in one city—Chicago, for example—may communicate with a plurality of subscribers in New York, in which case there would be located in each of these cities a central repeating-station, these repeating-stations being connected with each other by a single trunk-line, though a number of lines may be used when desired. By locating the proper apparatus at the central stations and at the subscribers' station this single line may be made to accommodate the messages passing between all of the subscribers simultaneously. In other words, the invention contemplates a system of multiplex intercommunication between subscribers, which is accomplished by providing each subscriber with apparatus which will allow him the use of the trunk-line connecting him with any other subscriber at regularly and rapidly recurring periods of time, and the location of the apparatus at the central stations, which will operate in conjunction with the apparatus at the substations to repeat the message from one line to the other. In this manner the number of so-called "private wires" connecting cities may be greatly reduced, as it will be seen that each subscriber in or around the city of Chicago, for example, may have private communication with a correspondent in New York and all over a single wire between these two cities. Moreover, as each subscriber may be made to receive signals or messages only at fixed intervals, determined by current-distributing devices, (hereinafter described,) perfect secrecy may be maintained, as any subscriber would be prevented absolutely from receiving the messages intended for another subscriber. This feature of the invention, however, is not confined to intercommunication between subscribers located in different cities, as a very useful application of the invention arises in the case of a plurality of subscribers located in or around a central distributing-point, in which case there need be but one repeating-station.

Special cases illustrating the principles of the present invention are shown in the accompanying drawings, in which—

Figure 1 is a diagram illustrating the principle of transmitting messages through a central dynamo or repeating station; and Fig. 1$^a$, a graphical representation of a group of alternating-current impulses, representing a signal or character. Fig. 2 is a diagram representing the circuits and connections of a subscriber's single outfit. Fig. 3 is a diagram illustrating the principle of repeating signals or messages through a central dynamo-station over "reflected-wave lines." Fig. 4 is a diagram illustrating the principle of repeating through a central station over two duplex lines. Fig. 5 is a diagram illustrating the principle of repeating through a central station over a plurality of reflected-wave lines. Fig. 6 is a diagram illustrating the principle of transmitting messages through central stations located at each end of a duplex line. Fig. 7 is a diagram illustrating an extension of the principle shown in Fig. 6. Fig. 8 is a diagram showing how four subscribers located in one city may communicate with four subscribers located in another city, each subscriber working through a central station at each end of a duplex line connecting the cities, and in which each subscriber's line is duplexed. Fig. 9 is a diagram showing how four subscribers in one city may communicate with four subscribers in another city through central stations located at each end of a duplex line connecting the cities, but in which the subscribers' lines are reflected-wave lines. Fig. 10 is a top plan view, partly in section, of the distributing-sunflowers and related parts located at central for the transmission of messages by the method shown in Fig. 9. Fig. 11 is a front elevation of the driving-disk by which the trailers of the distributers shown in Fig. 10 are driven. Fig. 12 is a diagram of the circuits and connections of one of the central stations indicated in Fig. 9, and Figs. 12$^a$ and 12$^b$ are graphical representations of signals sent through this station.

Similar letters and numerals refer to similar parts throughout the several views.

Reference will first be had to Fig. 1, which represents a central dynamo, repeating, or receiving station, at which messages arriving from various points may be repeated.

L L' represent two telegraph-lines, which enter the station from any outside points, and G an alternating-current dynamo or other source of periodic current, to one terminal $g$ of which both lines are connected. The dynamo G indicates a source of signaling-current, which is or may be used also for producing and maintaining synchronism, as hereinafter described. The messages arriving over line L are received first upon a line-relay LR', the tongue of which is electrically connected to the trailer or brush $r'$ of a receiving-sunflower R'. The segment-circuits of this sunflower traverse the coils of a group of selecting-relays SR' and pass by the common wire 1 to a point intermediate between resistances connected across the terminals of a source of constant-potential current. The trailer of this sunflower may be driven in any suitable way, but is so geared and the sunflower is so divided that the said trailer passes over one complete segment for each semicycle or impulse generated by the dynamo. Therefore as the trailer $r'$ passes from one segment to the next the tongue of the line-relay vibrated by the line-current will pass from one contact to the next, and as long as this continues without interruption each segment-circuit of the said sunflower will receive a local-current impulse once in each revolution of the trailer $r'$.

The forward contacts of the selecting-relays SR' are connected to the segment-circuits of a sending-sunflower S', whose trailer $s'$ is electrically connected to one terminal of the coil of a transmitter T', having its contact $t'$ normally traversed by the current on line L'. The other terminal of this transmitter-coil is electrically connected to the plus-terminal of the local source of direct current. The tongues of the selecting-relays SR' are all connected to the negative pole of the said local-current supply. In like manner messages arriving over line L' are received upon the main-line relay LR$^2$, which is connected to a receiving-sunflower and trailer R$^2$ and $r^2$, corresponding exactly to the sunflower R' and its trailer $r'$. In the segment-circuits of this sunflower R$^2$ are also connected selecting-relays SR$^2$, which have their forward contacts connected in the segment-circuits of a transmitting-sunflower S$^2$, the trailer $s^2$ of which connects to one terminal of the coil of a main-line transmitter T$^2$, having the line L normally completed through its contact $t^2$. The other terminal of this relay-coil is, as in the case of the transmitter T', connected to the positive pole of the local-current supply. The tongues of the selecting-relays $SR^2$ also, as described in reference to selecting-relays $SR'$, are connected to the negative pole of the local-current supply. The trailers on all of the sunflowers $R'$, $R^2$, $S'$, and $S^2$ travel in synchronism with the dynamo G, and, as described with reference to the trailer $r'$, each passes over one segment of a sunflower for each impulse generated by the dynamo. The coils of the selecting-relays $SR'$ and $SR^2$ are, however, so wound that the impulses normally distributed to them through the segment-circuits of the sunflowers $R'$ and $R^2$ send all of their tongues against their back-stops. If, however, a message arrives which causes the tongue of one of the relays $LR'$ or $LR^2$ to remain against one of its stops for the length of time that one of the trailers $r'$ or $r^2$ is passing over a segment, this will cause the relay connected to that segment over which the trailer is passing at the time the line-relay tongue is at rest to receive an impulse in the opposite direction to the normal impulse, which will send its tongue against the forward contact, completing one of the segment-circuits of the sending-sunflower to which that particular relay is connected. Then when the trailer of this sending-sunflower arrives upon the segment connected to the relays acted upon a circuit will be completed through one of the transmitter-coils, causing the transmitter to repeat the signal upon the line passing through its contact. Any system of signaling, therefore, by which either of the line-relays may be brought to rest at times corresponding to the particular signal transmitted may be employed with a repeating-station of this character. For the purpose of the present description, however, it will be assumed that the messages are impressed upon the lines which pass into the station, Fig. 1, by suppressing a definite number and combination of impulses in a group of line-current impulses for each character—for example, as shown in Fig. 1ª, which is a graphical representation of a character as shown by the suppressed and unsuppressed impulses. Assuming, therefore, that a signal arriving over the line L at any moment is such as is graphically represented in Fig. 1ª, the operation of repeating this signal on the line $L'$ is as follows: The first, second, third, and fourth impulses will pass the relay $LR'$ and vibrate its tongue between its contacts, as described; but at the time the fifth impulse should have passed through the said relay this impulse, according to this particular signal, is suppressed, and thus causes the tongue of the relay $LR'$ to remain against its contact to which it was last attracted. The trailer $r'$, then arriving upon the fifth segment of the sunflower $R'$, will transmit to the coil of the selecting-relay $SR'$ connected to that segment an impulse of opposite polarity to the normal impulse, which will send the tongue of the selecting-relay against its forward contact connected to wire 2, which is in turn connected to the fifth segment of the sending-sunflower $S'$, and when the trailer $s'$ reaches this segment the said trailer, being given sufficient lag to allow the relays to act before it reaches the said segment, will complete a circuit from the positive pole of the local-current supply through the coil of the transmitter $T'$, which will attract the striker and cause it to suppress an impulse on the line $L'$ corresponding to the fifth impulse received upon relay $LR'$, thus repeating the modification of the current from one line to the other. In like manner the relay $LR'$ will be brought again to rest by the suppressed eight impulse, which will transmit through the receiving-sunflower $R'$ current to the selecting-relay $SR'$ connected to the eight segment of that sunflower and cause that relay to complete a circuit through the coil of the transmitter $T'$ at an instant corresponding to the arrival of the transmitting-trailer $s$ upon its eight segment, which will cause the said transmitter to suppress a semicycle of the current upon the line $L'$ corresponding to the suppressed eighth semicycle of the line L. In this manner a complete character impressed upon the line is repeated on line $L'$ from the line L. In like manner any other character or signal represented by the suppression of one or more impulses in a group may be repeated upon the line $L'$ from the line L, in which case, obviously, other selecting-relays $SR'$ and $SR^2$ would be added and connected to corresponding segments of the sunflowers. Moreover, as the apparatus is symmetrical all that has been said of the relay $LR'$, its receiving and sending sunflowers, selecting-relays, and connections is true of the relay $LR^2$ and its receiving and sending sunflowers, selecting-relays, and connections, as messages may be transmitted through the station in either direction.

A printer P or other suitable recording device may be located at the central station for testing the accuracy of the apparatus in repeating the signals. For this purpose the wires 2 2' and 3 3' from the selecting-relays connect to plug-switches 4 4' or their equivalents, either of which may be connected to the printer P, as shown. If it is desired to record the signal or message arriving over line L, plugs 5 would be inserted in switch 4 and the double-pole switch 6 opened, the latter operation disconnecting the transmitter $T'$. Then the signal received upon the selecting-relays $SR'$, which would ordinarily have gone to operate the transmitter T, will pass by wire 7 to the printer or other recorder and cause it to record the signal. In this way some test-sentence can be selected, and if this is properly recorded the proper working of the central apparatus up to the point of repeating the message is indicated. The same explanation applies to messages or signals received over line $L'$, except in this case the plugs 5' would be inserted in switch 4' and the double-pole switch 6' would be opened instead of the switch 6 and the signal would be received upon relays SR² instead of relays SR'.

For the purpose of testing the apparatus when the messages pass through the central station from a number of separate subscribers or other sources two extra receiving-sunflowers R⁰ and R⁰⁰ are provided and have their trailers connected to the wires 1 and 1', respectively. These sunflowers in this case each have four segments corresponding to the separate messages which pass each way through the station, and the separate segments of each of these sunflowers are connected to separate contacts $k$ $k'$ of switches K K', the latter being connected to the wires 1 and 1', respectively. The trailers $r^0$ and $r^{00}$ are so geared that their speed around their sunflowers will be one-fourth of that of the trailers $r'$ and $r^2$, so that messages from one subscriber will pass through the central station at such times only as the trailers $r^0$ $r^{00}$ are upon their upper left-hand segments, for example, and messages from each of the other subscribers will pass in like order through the central station as the trailers $r^0$ $r^{00}$ pass over the succeeding segments of their sunflowers, so that by shifting the switches K K' from one contact to the other connected to these segments of the sunflowers R⁰ R⁰⁰ the recording apparatus at central may be made to test the accuracy of the signals or messages from any subscriber.

The relays LR' and LR² may or may not be differentially wound and balanced, depending upon the nature of the lines upon which they are used. If the line upon which either is used is duplexed, then the relay would be differentially wound and have one of its coils traversed by an artificial line L⁰ to balance the real line, in which case the home relay will be sensitive to signals from a distance only. The term "duplex" is herein used to designate a line upon which two signals may pass in opposite directions at absolutely the same instant, whether the line be multiplexed or not. If used upon a reflected-wave line, which will be hereinafter described, the relay would be balanced, but would be sensitive to signals passing it in both directions. If used upon an ordinary simplex line, then neither relay need be balanced. Moreover, while these line-relays are in all of the accompanying drawings shown as polar relays they may be replaced by neutral relays when desired without departing from the spirit of the present invention. Also the ordinary circuit-breaking transmitters herein shown may be replaced by any that will properly impress the signals or characters upon the line. This repeating or relaying of the messages may be employed for effecting intercommunications in a variety of ways, of which the following are some special examples.

In Fig. 3 is shown the simple case of a subscriber A communicating with a subscriber B through the central dynamo-station X over two reflected-wave lines L L'. In this case the connections at the central station are the same as shown in Fig. 1. The subscriber's outfit in this case comprises a main-line relay LR and a line-transmitter T and any suitable means for recording the signals received upon the line-relay and any suitable means for causing the transmitter to cut out or otherwise modify the proper impulses of the line-current to transmit a signal. Assuming that the transmitter T breaks the line through its contact and suppresses a definite number of impulses for each character, a signal transmitted from subscriber A would be received upon the line-relay LR² and repeated by the transmitter T² to the receiving-relay LR of the subscriber B, passing through the central station, as fully described with reference to Fig. 1. Ordinarily on any but very short lines breaking the circuit at the contact of the transmitter T would not produce any effect upon the central relay LR² on account of the capacity of the line, in which case messages could not be transmitted by locating the source of signaling-current at one end of the line only, as shown in Fig. 3. This, however, is overcome by balancing the line-relay LR², as follows: The line is broken through the subscriber's transmitter-contact. The dynamo G is then started, and the tongue of the relay LR² will continue to vibrate, notwithstanding that the line is broken at the distant station. This is due to the reflection of the current back toward the dynamo from the distant end, owing to the distributed capacity of the line. The artificial line L⁰ is then adjusted with the transmitter-contact at the subscriber's station still open, until the relay LR² is balanced and its tongue comes to rest. Therefore it will be seen that if this relay is balanced so that its tongue comes to rest with the line broken at the distant end or at the subscriber's transmitter it will continue to vibrate upon closing the line at the said transmitter. It will therefore be seen that signals may be transmitted over the line from both ends by locating the source of signaling-current at one end only. This same explanation applies to the receiving-relay LR' and its reflected-wave line. The maximum length of such reflected-wave lines is usually about three hundred miles. Therefore it will be seen that the location of a dynamo-station at some point intermediate between two distant points, as between subscribers A and B, enables these subscribers to communicate with each other over reflected-wave lines having a single source of signaling-current, though these subscribers be located at a much greater distance apart than would allow them to communicate with each other over a single reflected-wave line. In other words, this system of repeating enables the length of a reflected-wave line to be doubled. The subscriber A may be located in Boston and the subscriber B in Washington, and the only source of signaling-current employed would be that at the central repeating-station, which in this case would be located in New York, for example.

In Fig. 4 is shown the application of the repeating-station to two duplex lines L² L³, in which case the connections at central are substantially the same as in Fig. 3, except that the line-relays LR' and LR² are balanced by artificial lines with respect to the dynamos or other sources of signaling-current located at the subscribers' stations and are sensitive to signals which arrive from distant points only on their respective lines. In this case each subscriber is provided with a main-line receiving-relay LR and transmitter T, having the usual duplex connections, which necessitates the employment at each substation of a small dynamo or other source of signaling-current G'. In this case the signals transmitted from A' to B' would be received upon the relay LR², which will actuate the transmitter T² and repeat the signal on the line L³ to the relay LR of subscriber B', and at the same time the subscriber B' may transmit a message back to A' through the central repeating-station, as the relay LR' is sensitive to signals received from subscriber B' only, and will actuate transmitter T', which will repeat the signal to the receiving-relay LR of subscriber A' without affecting the relay LR², as all of these receiving-relays are balanced according to any of the well-known systems of duplexing. In the event that the dynamos G' are employed at the subscribers' ends of the duplex lines it is necessary in order to effect the proper repeating of the signals through the central stations that all of these dynamos run in synchronism. The specific means for producing this synchronism, however, forms no immediate part of the present invention, and hence need not be further described. The employment of duplex lines in this manner renders possible the transmission of messages over very long distances and at the same time enables the employment of the least number of sources of signaling-current or dynamos. For example, subscriber A' may be located in New York and the central station in Chicago and subscriber B' in Omaha, or these two subscribers may be two thousand miles apart. Moreover, by locating at the subscribers' stations proper multiplexing apparatus each of these duplex lines may be made octoplex.

In Fig. 5 is shown a case where a plurality of subscribers located at different points may communicate over reflected-wave lines through the central repeating-station to a plurality of other subscribers. This case contemplates the communication of subscriber A with subscriber B and subscriber C with subscriber D. In this case there is provided at the central station means for allowing the subscribers A and B the exclusive use of the central station for a fixed time and subscribers C and D the exclusive use of the central station for a corresponding period of time, these periods following each other in rapid succession. For this purpose the lines from subscribers A and B entering the central station are connected to trailers $q$ and $q'$, respectively, of a current-distributer Q, which is indicated in the diagram as made up of two circular disk members $q^2$ and $q^3$, each having four insulated conducting-segments, the diametrically opposite segments—namely, the shaded segments—of each of these disks being permanently electrically connected to the line $l^0$, traversing the main-line relay LR², while the blank segments are all electrically connected to a wire $l^2$, which connects to the wire $l^0$ at a point between the relay LR² and the dynamo. The distributer Q' is a duplicate of the distributer Q, its trailers or brushes $q^4$ or $q^5$ being connected to the lines from the subscribers B and D, respectively. Therefore it will be seen that messages between subscribers A and B may pass at such times as the trailers $q$ and $q^4$ arrive upon the shaded segments of the members $q^2$, while messages may pass between subscribers C and D as the trailers $q'$ and $q^5$ arrive upon the shaded segments of the members $q^3$, which are located in quadrants diametrically opposite to the shaded segments of the members $q^2$. This arrangement is rendered necessary on account of the fact that the relays LR' or LR² would not be affected by signals from the subscribers if the lines branched directly from the lines $l^0$, for then breaking the circuit at any subscriber's transmitter would only cut out a part of the current passing the coils of the central line-relay, which current would be overbalanced by the current passing the relay-coils to the other subscribers' lines. Hence it is necessary to give the line-receiving relay at central to the subscriber from which it receives its messages exclusively for the brief period that a particular signal is passing. The subscribers, however, receive current from the central dynamo for affecting the synchronism of their current-distributing apparatus, whether they are using the receiving-relay or not. For this purpose the blank segments of the distributers Q and Q' are connected to the dynamo-circuits at points between the dynamo and the receiving-relays LR' and LR². The subscribers A, B, C, and D are each provided with a single outfit, which comprises in addition to the line-relay LR, transmitter T, and other parts a sending-sunflower S and a receiving-sunflower R, the trailers of which are driven in synchronism with the central dynamo G, and all rotate at a fixed speed relative to said dynamo. Each sunflower is provided with a group of segments of preferably the same number of segments in each group and the segments of any sending-sunflower occupy the same angular position as the segments of the receiving-sunflower of the subscriber to which the messages are transmitted from the said sending-sunflower, and the sunflowers of all the subscribers have their segments so set that there will be no interference in the passage of the signals from one subscriber to another. This setting of the sunflowers is diagrammatically shown in Fig. 5, where the shaded portions of the sunflowers S and R represent the portions of the sunflowers in which the segments are cut. It will therefore be seen that inasmuch as a subscriber's transmitter is active at such times only as the sending-trailer is passing over the segments of the sending-sunflower at that station, and inasmuch as a subscriber's receiving-relay will record the signals at such times only as the trailer of the receiving-sunflower at that station is passing over its segments, subscriber A may transmit to subscriber B messages while his sending-trailer is in the upper left-hand quadrant of the sunflower. Hence subscriber B will so set his receiving-sunflower that its segments will occupy the upper left-hand quadrant and in this manner will render the receiving-relay of subscriber B active during the time that the transmitter of subscriber A is active. Subscriber B, however, so sets his sending-sunflower that its segments are one hundred and eighty degrees from the segments of his receiving-sunflower, so that the messages transmitted by him will not in this case be received upon his home-relay, but will be received upon the relay of subscriber A, since the receiving-segments of subscriber A are set to correspond in angular position to those of subscriber B. In this manner subscriber A can be sending messages to subscriber B, and subscriber B sending messages to subscriber A at the same time; but no two signals are upon the line at absolutely the same moment, as in the case of a duplex line. Subscriber C then adjusts his sending-sunflower so that its segments will be in the lower left-hand quadrant and his receiving-segments in the upper right-hand quadrant, and subscriber D adjusts his sunflowers so that their segments will correspond in angular position to those of subscriber C, as described with reference to subscribers A and B. In this way subscribers C and D may transmit to each other messages at the same time that subscribers A and B are transmitting to each other, in which case there would be four messages passing through the central station at the same time. If, however, any subscriber wishes to record his message upon his home relay as he transmits it, this may be done by shifting the segments of his receiving-sunflower until they correspond in angular position to those of his sending-sunflower.

A subscriber's single outfit is shown diagrammatically in Fig. 2, where S and R represent the sending and receiving sunflowers, provided with trailers $s$ and $r$, respectively. The trailer $s$ is connected, as by wire 8, to one terminal of the coil of the transmitter T, while the other coil of this transmitter is connected to the positive pole of a source of local direct current. The sending-sunflower segments may be of any desired number, but are cut of such a width and the trailer $s$ is driven at such a speed that the said trailer will pass over one segment for each impulse of the line-signaling current. The segment-circuits of the sending-sunflower pass through any suitable circuit making and breaking device, such as key H, to the negative pole of the source of local direct current. Therefore when any of these segment-circuits are completed, as by the key H, the transmitter T will be energized as the sending-trailer sweeps over the segments having their circuits completed by the said key and in this manner will suppress a combination of line-current impulses corresponding to the segments connected to the said key. The operator, however, can operate this key only at such times as the clapper-magnet $h$ attracts its clapper $h'$, which unlocks the key. The time at which this clapper-magnet may be energized is determined by the clapper-distributer $H^0$, which is provided with an insulated conducting-segment $h^0$. The circuit through the clapper-magnet is completed by the segment $h^0$ short-circuiting the brushes $h^2$. This segment, as shown in the diagram, is generally set in an angular position diametrically opposite to the sending-sunflower segments, so that the operator sets his key as the brushes $h^2$ make contact with the segment $h^0$, and the signal is not actually transmitted until the sending-trailer S arrives upon the segments connected to the key. The action of the transmitter is improved and sparking of the trailer $s$ is diminished by inserting a resistance 9 and condenser 10 in the transmitter-circuit, as shown. The receiving-sunflower R is preferably provided with the same number of segments as the sending-sunflower, which are cut of such a width and the trailer $r$ driven at such a speed that said trailer will pass over each segment for each impulse of the line-current. This trailer $r$ is shown carried upon the automatically-adjustable arm $r^x$, and $r^{xx}$ in a rotary contact-maker operating in conjunction with said arm. The circuit controlled by this contact-maker includes the tongue and contact of one of the selecting-relays and the coil of a magnet carried by the arm $r^x$, and the function of the said contact-maker is to periodically close the circuit of the magnet above mentioned after the said selecting-relay has acted, and thus effect the automatic adjustment of the said trailer-arm. This automatic trailer-setting device, however, forms no immediate part of the present invention and need not be further described. The trailer $r$ is connected, as by wire 11, to a point intermediate between resistances 12, connected across the terminals of the source of local current, and the segment-circuits of the sunflower are all connected by the common return-wire 13 to the tongue $lr$ of the double-tongued line-relay LR. The tongue-contacts of this relay are connected to two points of derivation of resistance connected across the terminals of the local-direct-current supply. By this arrangement the relay-tongue $lr$ vibrating between its contacts will transmit through the segment-circuits local impulses of alternate polarity as the trailer $r$ passes from one segment to the next and coming to rest will transmit through the segment-circuit connected to the trailer at the time that the tongue comes to rest an impulse of opposite polarity to its normal impulse, which may be made to operate apparatus of any character to properly record the signals. In the diagram Fig. 2 is shown a bank of selecting-relays SR for this purpose, which have their coils connected in the segment-circuits of the receiving-sunflower and operate in combinations depending upon the combination of line-current impulses modified for each particular character. These relays acting in this manner may record the intelligence in any desired way— such, for example, as by completing with their tongues local circuits to printing-machines, which will print the messages in typographical characters as they arrive. The trailers of each sunflower and all rotating parts at the substation, in fact, are driven either directly or indirectly by a synchronizer M, comprising a small direct-current motor having a series of coils traversed by an alternating current derived from a direct local current, or, if desired, by the line-current directly. A synchronizer of this character is fully shown and described in the Patent No. 622,636, granted to Henry A. Rowland April 4, 1899, for improvements in systems of multiplex telegraphy. For this purpose the line-relay LR is provided with a second tongue $lr'$, which is connected to one terminal of the alternating-current coils of the synchronizer, while the other terminal of said coils is connected to a point between two condensers U, connected across two wires 14, which lead from the local-direct-current supply to the contacts of a line-relay tongue $lr'$. By this arrangement the vibration of the relay-tongue $lr'$ between its contact sends an alternating current through the circuit 15 15, preferably of the same period as the line-current, the said local current being produced by the charging and discharging of the condensers U from the source of local direct current. This, however, only represents one of many ways of producing a local synchronizing-current from the line-current and may be replaced by any other method which may be found satisfactory. The apparatus indicated in Fig. 2 represents that of a single outfit operating upon a simplex or reflected wave line. To apply the apparatus to a duplex line, all that would be necessary would be to balance the line-relay LR by an artificial line, as indicated in Fig. 4, and make the ordinary duplex connections to the transmitter, also indicated in Fig. 4, or in any well-known way. In this case the segments upon the sending and receiving sunflowers would occupy corresponding angular positions, as the home receiving-relay would not be sensitive to signals transmitted from the home transmitter. Also in this case there would be no necessity of employing the synchronizer M, since ordinarily a small dynamo would be located at the subscriber's station for effecting the duplexing, though, however, as will be hereinafter shown, it is not necessary in order to effect duplexing to locate a dynamo at the subscriber's station, since the same thing may be accomplished by substituting for the dynamo a relayed circuit in which the current is derived from a source of local direct current. Moreover, the transmitter T simply represents the well-known form of circuit-breaking transmitter and may be replaced by any equivalent device which will effect the proper modification of the line-current, which, as hereinbefore stated, may consist either in suppressing a definite number of line impulses, reducing these in intensity, or in reversing their polarity, or, in fact, in any way modifying the line-current impulses to transmit intelligence according to this or any well-known system of telegraphy.

In Fig. 6 is represented a duplex line, at each end of which is located a repeating or dynamo station connecting the duplex line at each end to the reflected-wave line. This case contemplates the location of central dynamo-stations at two distant points X and Y, one, for example, in Chicago and the other in New York, and the transmission of messages through these stations from subscribers located within a radius of three hundred miles of each of these cities. A represents a subscriber's outfit located, for example, somewhere around Chicago and communicating with a central station in that city over the reflected-wave line $L'$, thence through the central station X at Chicago, as described, over the line $L''$ to the central station Y in New York, where it will be repeated on reflected-wave line $L'''$ to the subscriber B. If desired, each of these subscribers may employ two local transmitting instruments and two local recorders, in which case each subscriber would have segments cut upon half of his sending-sunflower and upon the other half of his receiving-sunflower, as indicated diagrammatically in Fig. 6. Moreover, if desired, the lines leading from the central station to the subscribers may be duplex, in which case each subscriber may be provided with multiplexing apparatus, when all of the lines become octoplex.

In Fig. 7 is shown an extension of the case shown and described with reference to Fig. 6. In this case two subscribers A and C, for example, located at different points around the central station $X'$ in Chicago, may communicate over the duplex line through a central station $Y'$, located in New York, for example, with two subscribers B and D, located in the case illustrated within a radius of three hundred miles of that city. The messages from A and C are transmitted to the central station $X'$ in exactly the same way as described with reference to the transmission of messages from subscribers A and C through the central station X, (shown in Fig. 5,) and the same is true with respect to subscribers B and D relative to the station Y'. Moreover, as described with reference as to Fig. 6 the lines leading from the central stations to the subscribers may, if desired, be duplexed and octoplexed.

In Fig. 8 is shown an extension of the case illustrated in Fig. 7. In this case four subscribers A, B, C, and D communicate over duplexed lines with four subscribers A', B', C', and D'. Each of the central repeating-stations is provided with a current-distributing device $Q^2$, acting on the same principle as those described and shown in Fig. 5, except in this case the device is provided with four disks or their equivalents instead of two, as there are in this case four subscribers' lines. In this way the receiving-relay $LR^2$ is given exclusively to subscriber A, as the current-distributing trailer connected with that line passes over the shaded quadrant of the disk $q^6$ and is given exclusively to subscribers B, C, and D successively as the trailers connected to those lines pass over the shaded segments of the members $q^7$, $q^8$, and $q^9$. The blank portions of the segments are all connected to a point, as $q^0$, in the line between the transmitter T' and relay LR' and enables all of the subscribers to receive current from the dynamo continuously for regulating the synchronizing mechanism. The same explanation applies to the current-distributer on the right, connected to the lines of the subscribers A', B', C', and D'. The central receiving-relays LR' and $LR^2$ and transmitters T' and $T^2$ are provided with the usual duplex connections, so that the relays LR' are sensitive to signals arriving at the central from the substations only and not over the main line, while the relays $LR^2$ are sensitive to signals which arrive over the main line only. Likewise the main-line relay and transmitter at each substation is provided with the usual duplex connections in this case, which necessitates the location at each substation of a small dynamo G' or other source of signaling-current—such, for example, as a transformer working upon a relay-circuit, as hereinafter described. This duplexing enables each subscriber to set his receiving and transmitting sunflower segments in corresponding angular positions or in the case illustrated in corresponding quadrants, and the subscribers who communicate with each other all have their sunflower-segments set in corresponding angular positions. Thus in the case illustrated the segments of the sunflowers of subscriber A occupy the same angular position as those of the sunflowers of subscriber A', and those of subscriber B the same angular position as those of subscriber B', and so on through the series. In this way in a given time A and A' may send signals to each other during the first quarter of this time, B and B' may send signals to each other during the second quarter, C and C' during the third quarter, and D and D' during the fourth quarter. Then as the lines are all duplexed each subscriber may send a signal to his corresponding subscriber, while at the same time receiving a signal from him. In this way all of the subscribers may be sending messages over the main line connecting the two central stations at the same time, in which event there would be eight messages traveling simultaneously between central stations. Therefore if we assume that the central station $X^2$ on the left is located in Chicago and that the station $Y^2$ is on the right in New York it will be seen that each subscriber in and around Chicago may have private communication with a correspondent in New York and all over a single line between those two cities. Moreover, as each subscriber may receive signals only at fixed intervals determined by the current-distributers perfect secrecy may be maintained, as one subscriber would be prevented from receiving the signals intended for another, owing to the fact that all of the subscribers' receiving-relays would be balanced, so that they would operate only during the interval of time alloted to each by the central-station distributer $Q^2$. Furthermore, the case herein illustrated is not limited to four subscribers at each end of the main line. There may be six or eight of these subscribers at each end of the line or, indeed, a greater number. In the case, for example, that eight subscribers are located at each end of the line the segments on the subscribers' sunflowers would occupy one-eighth of the sunflower instead of a quadrant of it, as shown in Fig. 8. In any event in the case illustrated in Fig. 8 the dynamos G must run in synchronism with each other and with the dynamos G', located at the substations, in the case that such dynamos are employed at the substations, or in case that these dynamos are not employed at the substations with the synchronizing mechanism which operates the substation-sunflowers.

In Fig. 9 is shown the case of four subscribers A, B, C, and D communicating with four subscribers A', B', C', and D' through repeating-stations $X^3$ and $Y^3$, located at each end of a duplex main line, but in which each subscriber communicates with its corresponding central station over a reflected-wave line having its separate receiving-relay located at central. In this case the central repeating-station is provided with a main-line relay $LR^2$, transmitter T', and dynamo G, provided with the usual duplex connections in the same manner as shown in the preceding duplex central stations; but in this case the transmitter $T^2$ is replaced by two transmitters $T^3$ and $T^4$ and the receiving-relay LR' by four receiving-relays $LR^3$ to $LR^6$, each of these relays being located upon a separate reflected-wave line leading to its corresponding subscriber. By this arrangement of the central-station connections and apparatus all of the subscribers may be sending and receiving messages simultaneously to and from their corresponding subscribers without duplexing the subscribers' lines leading to the central stations, and therefore without employing at each subscriber's station the usual duplex apparatus, which necessitates the employment of a source of signaling-current by each subscriber in addition to the source of such current located at the central stations. Messages transmitted from subscriber A passing to the central station will be first received upon the line-relay $LR^3$, and this relay will then cause the transmitter T' to repeat the signal upon the main line, which, however, will not affect the relay $LR^2$, as this relay is differentially wound and balanced for signals from the distant end of the main line only. The signal repeated on the line by the transmitter T' will then be received at the other central station upon the relay $LR^2$ at that station, and this relay will cause the transmitter $T^3$ at that station to repeat the signal to the subscriber A'. This signal will also be received by relay $LR^3$ at the central station connected to the line of subscriber A'; but this will produce no effect, as will be hereinafter more fully described.

The connections and apparatus of the central station for repeating the messages as described with reference to Fig. 9 are shown diagrammatically in Fig. 12. The operation of transmitting a given signal through this station is as follows: Let it be assumed that the signal is transmitted from subscriber A' and that the particular signal is the letter "X," and that this letter is produced by the suppression of the ninth and eleventh line-current impulses in a group of eleven, as graphically represented in Fig. 12$^a$. The first to the eighth impulses will vibrate the tongue of the line-relay $LR^3$ between its contacts alternately as each impulse passes its coils; but, as will be later shown, this will produce no effect upon the local repeating apparatus; but as the ninth impulse is missing the tongue of the relay $LR^3$ will remain against the contact to which it was last attracted—namely, to the contact connected to the positive pole of a source of constant-potential current. This current will then flow from the said plus pole through the contact of the relay $LR^3$, against which the tongue of the relay is resting, through wire 16, connected to the said relay-tongue, and then into the upper left-hand segment of the four-segment sunflower $R^5$, through the trailer $r^5$ into trailer $r^4$ of the sunflower $R^4$, having in this case four groups of cross-connected segments corresponding in angular position to the segments of the sunflower $R^5$. Both of these sunflowers are so adjusted that their upper left-hand segments correspond in angular position to those upon the sending-sunflower of subscriber A'. The trailers $r^4$ and $r^5$ also occupy a fixed angular position to the trailers of the sending-sunflower of subscriber A', and all rotate in synchronism with the dynamo G and may be driven in any convenient way. At this time the trailer $r^4$ will have reached the segment of its sunflower—namely, segment nine of the upper left-hand group—corresponding to the suppressed ninth impulse. The current will then pass from the trailer $r^4$ through the ninth segment, over which it is passing, into wire 17, and thence by this wire through the coils of one of the selecting-relays $SR^3$, and then by a common return-wire 18 back to a point 19 intermediate between resistances 20, connected across the terminals of the local-direct-current supply. The circuit being thus completed through the coils of the selecting-relay, the tongue of this relay will be sent against its forward stop connected to the wire 21. This wire 21 connects to the ninth segment of the sunflower $S^3$, corresponding in angular position to the ninth segment of the sunflower $R^4$. When the trailer $s^3$ arrives upon the ninth segment of the upper left-hand group, (the segments of the sunflower $S^3$ corresponding to those of the sunflower $R^4$,) current will flow from the positive pole of the source of local direct current into a wire 23, and thence through the coils of the transmitter T', trailer $s^3$, the sunflower $S^3$, then back to the negative pole of the current-supply. The transmitter T' will then break the line-circuit for the length of time that an impulse would take to pass its contact, which corresponds to the time consumed by the trailers $s^3$ and $r^4$ in passing over one segment. The transmitter T' will therefore suppress an impulse upon the main line corresponding to the ninth impulse, which was suppressed by the subscriber A', and in this manner will repeat the signal. In like manner the tongue of the line-relay $LR^3$ will come to rest at the time the eleventh impulse is suppressed and will complete a circuit through the selecting-relay $SR^3$, having its coils connected to the eleventh segment of the upper left-hand group of the sunflower $R^4$, which will complete the circuit through the coils of the main-line transmitter T', as described above, as soon as the trailer $s^3$ arrives upon the eleventh segment of its upper left-hand group. If this same signal has been sent by all of the other subscribers—that is, by B', C', and D'—it would be received upon the relays $LR^4$, $LR^5$, and $LR^6$, respectively, and transmitted through the repeating-station, just as described. The tongues of these relays $LR^3$ to $LR^6$ are, however, connected each to a corresponding segment of the sunflower $R^5$, so that the signals will follow each other through the station as the trailer $r^5$ passes from one segment to the next. Moreover, any other signal or character represented by a combination of suppressed or otherwise-modified line impulses may be transmitted through this central station, in which case, obviously, other selecting-relays $SR^3$ would be added and connected to corresponding segments of the sunflowers S³ and R⁴. The selecting-relay on the right of the group SR³ may be used exclusively for producing signals upon a bell W or other signaling device by shifting the switch 24 to the contact 25. Then the signal received by this relay instead of being transmitted on over the main line will stop at the central station and ring the bell W, which may be used to convey any desired information from the subscribers A', B', C', and D' to central. Let it next be required to repeat a signal arriving over the main line and received by the relay LR² upon any of the lines leading to subscribers A' to D'. It will be assumed for the purpose of explaining this operation that the signal arriving is such as is graphically represented by Fig. 12$^b$, which we will assume is the letter "Y," and that this letter is intended for subscriber A'. As the first impulse of the group is suppressed the tongue of the relay LR² will remain against the contact to which it was attracted by the impulse just preceding the suppressed one, which in this case will be seen to have been a positive impulse. Current will then flow from the positive pole of the source of local direct current through the tongue of the relay LR² into wire 26 and thence into the four-plug switch 27, in which all of the plugs are supposed to be inserted, and connect the four sections of this switch to the four segments of the sunflower R⁷. At the time this signal is received the trailer $r^7$ will have arrived upon the lower right-hand quadrant of the sunflower R⁷, since this quadrant corresponds in angular position to the quadrant of the receiving sunflower-segments of subscriber A'. As the trailer $r^7$ arrives upon this quadrant of the sunflower R⁷ current will then pass through it to trailer $r^6$, to which it is electrically connected, and thence through the first segment of the lower right-hand group of segments of the sunflower R⁶, and thence by wire 28 to the coils of a selecting-relay of the group SR⁴, and thence by the common return-wire 29 back to the negative pole of the local-current supply. The current thus traversing the coils of this selecting-relay will send its tongue against its forward contact connected to wire 30 into the first segment of the lower right-hand group of the sending-sunflower S⁴. As the trailer $s^4$ arrives upon this segment current will flow from the plus pole of the local-current supply into wire 32, then through the coils of the transmitter T³ into trailers S⁴, through the first segment of the lower right-hand group of sunflower S⁴, and thence by wire 30 through the tongue and contact of the selecting-relay SR⁴ acted upon back to the negative pole of the local-current supply by wire 23, causing the transmitter T³ to suppress an impulse upon the line 33 corresponding to the first impulse of the group received upon the relay LR², and as this line passes on through relay LR³ to subscriber A' the signal will thus be repeated to him. In like manner the transmitter T³ will suppress an impulse again on the line 33 as the relay LR² is brought to rest by the next suppressed impulse, which, according to the diagram Fig. 12$^b$, is the third of the group, and in this case the selecting-relay of the group SR⁴, which acts to repeat the signal, will be one having its coils connected to the wire 34, which leads to the third segment of the group of segments of the sunflower R⁶, corresponding to the group of impulses representing this character. To transmit other signals to subscriber A', other selecting-relays would be added and have their coils connected to other segments of the sunflower R⁶ and their contacts to other segments of the sunflowers S⁴ and S⁵. It will thus be seen that the subscriber to which any message may pass through the central station, Fig. 12, from over the main line is determined by which of the quadrants of the sunflowers R⁶, R⁷, S⁴, and S⁵ their trailers are upon at the time the signal arrives. Therefore, as the receiving-segments of subscriber A' are located in the lower right-hand quadrant of his sunflower, messages may pass through central to this subscriber at such times only as the trailers of the sunflowers R⁶, R⁷, and S⁴ are upon the lower right-hand quadrant of these sunflowers and likewise as the segments of the receiving-sunflower of subscriber D' are in the lower left-hand quadrant messages may pass through central to this subscriber at such times only as the trailers of the sunflowers R⁶, R⁷, and S⁵ arrive upon the lower left-hand quadrants of these sunflowers. The transmitter T³, however, repeats only such signals as are intended for subscribers A' and B', while the signals intended for subscribers C' and D' are repeated on their lines by a second main-line transmitter T⁴. For this reason the sunflower S⁴, having its trailer connected to the transmitter T³, is provided with only two groups of segments corresponding in angular position to the receiving-segments of subscribers A' and B', while the sunflower S⁵, having its trailer connected to the coil of the transmitter T⁴, is provided with two groups of segments corresponding in angular position to the receiving-segments of subscribers C' and D'. The segments of the sunflowers S⁴ and S⁵ are cross-connected, and these segments are connected to their respective selecting-relays SR⁴.

In order to test the accuracy of the signals passing through central, a printer P may be connected to the wires which are connected to the forward tongue-contacts of the selecting-relays. This printer or other recorder may be provided with a double pole-switch $p$, and in this way may be thrown into or out of the relay-circuit and made to record the signals as they pass to central at will. If it is desired to record the message arriving from subscribers A', B', C', and D', the printer P would be connected to the forward contacts of the relays SR³ in the same way that it is shown connected to the relays SR⁴, any suitable switch being provided for connecting or disconnecting the printer to or from the selecting-relay.

If the switch 35 is shifted to contact 36, the signals received upon the selecting-relay on the left of the group SR⁴ may be made to ring a signal-bell W′ and convey any desired information from the subscribers at the distant end of the main line to the central operator. This selecting-relay will act exactly in the same manner as the rest of the relays in repeating a modified impulse from one line to the other, in which case the tongue would be sent against the forward contact connected to the wire 37. Current would then flow from the positive pole of the local-current supply through the coil of the bell W′ back to the negative pole of the direct-current supply if the switch 35 is thrown over upon the contact 36. In the diagram this signal-selecting relay is shown with its coils connected to the twelfth segment of each of the group of segments of the sunflower R⁶, so that the bell W′ may be rung by subscribers A, B, C, and D as the trailer $r^6$ passes over the first, second, third, and fourth quadrants, respectively. Then by shifting the switch on to contact 39 and inserting plugs in the proper sockets of the switch 40 the central operator may transmit signals to subscriber A′ B′ C′ D′ and operate the signal-bells of these subscribers in the same manner that the signal-bell at central is operated. For this purpose there is provided at central a push-button, key, or equivalent device 41, one terminal of which is connected to a switch leading to the negative pole of the local-current supply and the other terminal to the wire 38. Let it be required to send a signal by this push-button to any of the subscribers—subscriber B′, for example—the central operator would insert a plug in socket 42 of the plug-switch 40, which would connect the twelfth segment of the upper right-hand group of the sunflower S⁴ to the wire leading from the switch 40 to the switch 35. Then by pressing the push-button or key 41 current would flow in a circuit which may be as follows: from the negative pole of the local current-supply through the key into wire 38, into a switch 35, plug-switch 40, wire 43, into the sunflower S⁴, and then into the trailer $s^4$, which will be at that moment resting upon the segment to which the wire 43 is connected, and from this trailer through the coils of the transmitter T³ to the positive pole of the local-current supply. This will cause the transmitter T³ to suppress a line-current impulse at such a moment as the segment of the receiving-sunflower of subscriber B, connected to suitable receiving apparatus, passes beneath its trailer, which will record the signal thus transmitted. By inserting plugs in other sockets of the switch 40 signals may in this manner be sent to the other subscribers. In order, however, for any signal to pass through the central station and be received by any one of the subscribers, it is essential that all of these subscribers have their trailers and the segments of their sunflowers occupy fixed angular positions relative to the sunflowers R⁶, R⁷, S⁴, and S⁵ and their trailers. This is done preferably by providing each subscriber with a device for automatically adjusting the angular position of his receiving-trailer until it is brought into the proper position relative to that of the sending-trailer from which it receives messages. For the purpose of operating this automatic trailer-setting device at each of the substations one of the segments in each group of the sunflowers S⁴ and S⁵—the thirteenth segment, for example—is normally permanently connected, as by wire 43, to the positive pole of the local-current supply. This will cause the transmitters T³ and T⁴ to suppress a line-current impulse passing to one of the subscribers—A′ to D′, for example—once in each revolution of the receiving-trailers of all of the subscribers, and thus operate the automatic trailer-setting mechanism, as described in said patent application. It is also essential that the trailer $r^6$ and the segments of the receiving-sunflowers R⁶ occupy the same angular positions as the sending-sunflower at the central station $x^3$, corresponding to the sending-sunflower S³ of the station shown in Fig. 12. For this purpose the transmitter T′ at station X³ suppresses or otherwise modifies one or more impulses of the line-current at fixed intervals corresponding to the arrival of the trailer $r^6$ upon a preselected segment or segments of the sunflower R⁶. Therefore if the times of suppression of the line-current by the transmitter T′ coincide with the time of the arrival of the trailer $r^6$ upon the said segment or segments the trailer $r^6$ will be properly set, and this may be indicated by a relay $sr^4$, connected to the said preselected segments—that is, when the trailer is properly set this relay may receive the signal sent by the transmitter T′ at fixed intervals; but if the trailer is not properly set the signal cannot, therefore, be received upon the relay. This relay is so wound that the reception of a signal sends its tongue against its forward contact, where it will remain until it fails to receive these signals at the intervals stated, when its tongue will be sent against its back-stop. When the tongue of this selecting-relay is sent over against its back-stop, it may be made either to sound a signal, and thus indicate the improper setting of the trailer $r^6$ relative to its sunflower-segments, or this tongue may be made to complete a circuit from the negative pole of the local-current supply through the wire 44 to a magnet N and effect the automatic setting of the trailer. For this purpose the trailer $r^6$ is preferably in practice mounted upon a disk $n$, (see Fig. 10,) which is provided with a series of apertures $n^0$ near its periphery. This disk is mounted fast upon a shaft O, one end of which is reduced, as at $o$, and turns in one end of the shaft O′. Mounted fast upon this shaft O' is a gear-wheel Z, which carries the magnet N. This magnet is provided with a plunger $n'$, which is adapted to engage the apertures $n^0$ of the disk $n$ and is held normally in engagement with the said apertures by the spring $n^2$. This gear Z meshes with a pinion Z', driven by the source of local power. One terminal of the coil of the magnet N passes to a contact-pin $n^3$, carried by and insulated from the gear-wheel Z. Located in the path of this pin is a spring $n^4$, carried by an arm $n^5$, which is connected to the wire 44, leading to the back-stop contact of the relay $sr^4$. It will therefore be seen that as long as the tongue of this relay remains against its forward contact, which it will do so long as the trailer $r^6$ is properly set, the plunger of the magnet N will engage one of the apertures of the disk $n^0$, and thus form the driving connections from the gear-wheel Z to drive the trailer. When, however, the tongue of this relay $sr^4$ is sent against its back-stop, it partially completes the circuit through the coils of the magnet N, which will be entirely completed by the pin $n^3$ coming in contact with the spring $n^4$ once in every revolution of the gear Z, so that once in each revolution of this gear-wheel if the trailer $r^6$ is not properly set the magnet N will draw its plunger away from the disk $n$, which latter will drop back, when the magnet-plunger will engage another aperture, and if the tongue of the relay $sr^4$ still remains over against its back-stop the magnet N will become energized again as the pin $n^3$ comes in contact with the spring $n^4$, and the magnet will again release its plunger from the disk and allow the trailer to drop back. Thus the said trailer will continue to drop back step by step until it arrives at the proper point on the sunflower, when the tongue of the relay $sr^4$ will pass over to its forward stop, and thus break the electrical connection from the source of local direct current. This operation will be repeated at each time that the trailer $r^6$ gets out of the proper adjustment.

Fig. 10 represents the central-station sunflowers and trailers as they appear in practice, where it will be seen that each of these sunflowers is mounted upon a separate sleeve $O^5$, carried loosely upon the shaft O and held in the proper angular position by the arms $o^2$, which are held in engagement with suitable supports $o^3$ by suitable clamping-screws $o^4$. These trailers are mounted upon arms $O^3$, keyed on the shaft O, as shown.

The specific form of signals herein described for the purpose of illustrating the principle of the invention only represents one of several ways of signaling or telegraphing which may be used with the present invention, as it is proposed to adapt this invention to any of the well-known systems of telegraphic signals. Moreover, any desired system of signaling may be employed between the central operator and the subscriber.

Having thus described the said invention, what is claimed, and desired to be secured by Letters Patent of the United States, is—

1. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, and local circuit making and breaking devices operated by the receiving instruments of one line and automatically operating the transmitting instruments of another line.

2. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local circuit making and breaking devices located in the segment-circuits of said current-distributers, said devices being operated by the receiving instruments and automatically operating the transmitting instruments and thus repeating the signals through said station.

3. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local relays located in the segment-circuits of said current-distributers, said relays being operated by the main-line receiving instruments and adapted to automatically operate the transmitting instruments and thus to repeat the signal through said station.

4. The combination with two or more telegraph-lines, of a repeating-station located upon said lines and comprising the following elements, viz., a source of periodically-varying electromotive force from which said lines receive current, main-line transmitting and receiving instruments, local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station.

5. The combination with two or more telegraph-lines, of a repeating-station located upon said lines and comprising the following elements, viz., an alternating-current dynamo from which said lines receive current, main-line transmitting and receiving instruments, local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station.

6. The combination with two or more telegraph-lines, of a repeating-station located upon said lines and comprising the following elements, viz., a source of electricity from which said lines receive current, main-line transmitting and receiving instruments, synchronously-operated local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station.

7. The combination with two or more telegraph-lines, of a repeating-station located upon said lines and comprising the following elements, viz., a source of electricity from which said lines receive current, main-line transmitting instruments and main-line balanced receiving-relays, local transmitting and receiving current-distributers operating in conjunction with said main-line instruments, local circuit making and breaking devices located in the segment-circuits of said current-distributers, said devices being operated by said main-line receiving instruments and adapted to automatically operate the main-line transmitting instruments and thus to repeat the signals through said station.

8. The combination with two or more duplex telegraph-lines, of a repeating-station located upon said lines and comprising the following elements, viz., a source of electricity from which said lines receive current, main-line transmitting instruments and main-line balanced receiving-relays, local transmitting and receiving current-distributers operated in conjunction with said main-line instruments, local circuit making and breaking devices located in the segment-circuits of said current-distributers, said devices being operated by said main-line receiving instruments and adapted to automatically operate the main-line transmitting instruments and thus to repeat the signal through the said station.

9. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local selecting-relays having their coils connected in the segment-circuits of said receiving current-distributers and their contacts connected in the segment-circuits of said transmitting current-distributers, said relays being operated by the receiving main-line instruments and adapted to automatically operate the main-line transmitting instruments and thus to repeat the signals through said station.

10. The combination with two or more telegraph-lines, of a repeating-station located upon said lines and comprising the following elements, viz., an alternating-current dynamo from which said lines receive current, main-line transmitting and receiving instruments, local transmitting and receiving current-distributers operating in conjunction with said main-line instruments, local selecting-relays having their coils connected in the segment-circuits of said receiving current-distributers and their contacts connected in the segment-circuits of said transmitting current-distributers, said relays being operated by said main-line receiving instruments and adapted to automatically operate the main-line transmitting instruments and thus to repeat the signals through said station.

11. The combination with two or more telegraph-lines, of a repeating-station located upon said lines and comprising the following elements, viz., a source of periodically-varying electric current from which said lines receive current, main-line transmitters adapted to suppress a definite number of line-current impulses for each signal, main-line receiving-relays, local transmitting and receiving current-distributers operating in conjunction with said main-line transmitters and relays, local circuit making and breaking devices located in the segment-circuits of said current-distributers, said devices being operated by the receiving main-line relays and adapted to automatically operate the main-line transmitters and thus to repeat the signals through said station.

12. The combination with two or more telegraph-lines, of a repeating-station located upon said lines and comprising the following elements, viz., an alternating-current dynamo from which said lines receive current, main-line transmitters adapted to suppress a definite number of impulses of the line-current for each signal, main-line relays adapted to receive signals arriving at said station, local transmitting and receiving current-distributers operating in conjunction with said main-line instruments, local selecting-relays having their coils connected in the segment-circuits of the receiving current-distributers and their contacts connected in the segment-circuits of the transmitting current-distributers, said relays being operated by the reception of signals upon the main-line relays and adapted to automatically actuate the main-line transmitters and thus to repeat the said signals through the station.

13. The combination with two or more telegraph-lines, of a repeating-station located upon said lines and comprising the following elements, viz., a source of electricity from which said lines receive periodically-varying current, main-line transmitting and receiving instruments, local transmitting and receiving current-distributers, a source of local constant potential current connected to the segment-circuits of said receiving current-distributers and having its polarity periodically changed by the main-line receiving instruments, local selecting-relays connected in the segment-circuits of the receiving current-distributers and having their contacts connected in the segment-circuits of the transmitting current-distributers, the said selecting-relays being operated by the reception of signals upon the main-line receiving-relays and adapted to automatically operate the main-line transmitters and thus to repeat the signals through the said station.

14. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local circuit making and breaking devices located in the segment-circuits of said current-distributers, said devices being operated by the receiving main-line instruments and adapted to automatically operate the main-line transmitting instruments and thus to repeat the signals through said station, and auxiliary current-distributers adapted to render said local circuit making and breaking devices operative at regularly-recurring periods.

15. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local selecting-relays having their coils connected in the segment-circuits of the receiving current-distributers and their contacts connected in the segment-circuits of said transmitting current-distributers, said relays being operated by the receiving main-line instruments and adapted to automatically operate the main-line transmitting instruments and thus to repeat the signals through said station, and auxiliary current-distributers located in the circuits of the coils of said relays and adapted to render the said relays operative at regularly-recurring periods.

16. The combination with two or more telegraph-lines, of a repeating-station located upon said lines and comprising the following elements, viz., a source of electricity from which said lines receive current, main-line transmitting and receiving instruments, local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station, and main-line current-distributers allowing the passage of signals through said repeating-station at regular intervals.

17. The combination with a plurality of telegraph-lines, of a repeating-station located upon said lines and comprising the following elements, viz., a source of electricity from which said lines receive current, main-line transmitting and receiving instruments and main-line current-distributers rendering said main-line instruments operative over said lines at regular intervals, local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station.

18. The combination with a plurality of telegraph-lines, of a repeating-station located upon said lines and comprising the following elements, viz., an alternating-current dynamo from which said lines receive current, main-line transmitting and receiving instruments and main-line current-distributers rendering said main-line instruments operative over said lines at rapidly-recurring intervals, local transmitting and receiving current-distributers operating in conjunction with said main-line instruments, local circuit making and breaking devices located in the segment-circuits of said current-distributers, said devices being operated by the main-line receiving instruments and adapted to automatically operate the main-line transmitting instruments and thus to repeat the signals through said station.

19. In a telegraph system, the combination with a main line, of a central station located at each end of said line, subscribers' lines leading from said stations and synchronous automatic repeating apparatus located at said stations for repeating signals from said main line over the subscribers' lines and vice versa.

20. In a telegraph system, the combination with a main line, of a central station located at each end of said line, subscribers' lines leading from said stations and synchronous multiplex automatic repeating apparatus located at said stations for repeating messages from said main line over said subscribers' lines and vice versa.

21. In a telegraph system, the combination with a main line, of a central station located at each end of said line, subscriber's line leading from said stations and repeating apparatus located at said stations, said apparatus comprising the following elements, viz., a source of electricity from which said lines receive current, main-line transmitting and receiving instruments, local transmitting and receiving current-distributers operating in conjunction with said main-line instruments and local circuit making and breaking devices operated by the receiving instruments of one line and automatically operating the transmitting instruments of another line.

22. In a telegraph system, the combination with a main trunk-line, of a central station located at each end of said line, subscribers' lines leading from said stations and multiplex repeating apparatus located at said stations and comprising the following elements, viz., a source of electricity from which said lines receive current, main-line transmitting and receiving instruments, local transmitting and receiving current-distributers operating in conjunction with said main-line instruments, local relays located in the segment-circuits of said current-distributers, said relays being operated by the line-receiving instruments and adapted to automatically operate the transmitting instruments and thus to repeat the signals through the said stations.

23. In a telegraph system, the combination with a main trunk-line, of a central station located at each end of said line, subscribers' lines leading from said stations, a source of periodically-varying electric current located at each of said stations and automatic multiplex repeating apparatus also located at said stations for repeating the messages from said main line over said subscribers' lines and vice versa.

24. In a telegraph system, the combination with a main trunk-line, of a central station located at each end of said line, subscribers' lines leading from said stations, an alternating-current dynamo located at each of said stations, from which said lines receive current, and automatic repeating apparatus located at said stations for repeating the messages from said main trunk-line over said subscribers' lines and vice versa.

25. In a telegraph system, the combination with a main duplex trunk-line, of a central station located at each end of said line, subscribers' lines leading from said stations and synchronous automatic repeating apparatus located at said stations for repeating the messages from said main line through the subscribers' lines and vice versa.

26. In a telegraph system, the combination with a main duplex trunk-line, of a central station located at each end of said line, subscribers' lines leading from said stations, a source of periodically-varying electric current from which said lines receive current located at each station, and synchronous multiplex automatic repeating apparatus located at said stations for repeating the messages from said main trunk-line over said subscribers' lines and vice versa.

27. In a telegraph system, the combination with a main duplex trunk-line, of a central station located at each end of said line, subscribers' lines leading from said stations, a source of periodically-varying electric current located at each of said stations from which said lines receive current, and multiplex repeating apparatus located at said stations comprising the following elements, viz., line transmitting and receiving instruments, local transmitting and receiving current-distributers operating in conjunction with said line instruments, local circuit making and breaking devices located in the segment-circuits of said current-distributers, said devices being operated by the line receiving instruments and adapted to automatically operate the line transmitting instruments and thus to repeat the signals through the said stations.

28. In a telegraph system, the combination with a main trunk-line, of a central station located at each end of said line, subscribers' lines leading from said stations, a source of periodically-varying electric current from which said lines receive current, and multiplex repeating apparatus located at said stations comprising the following elements, viz., line transmitting and receiving instruments, local transmitting and receiving current-distributers operating in conjunction with said line instruments, local circuit making and breaking devices located in the segment-circuits of said current-distributers, said devices being operated by the line receiving instruments and adapted to automatically operate the line transmitting instruments and thus to repeat the signals through the said stations.

In testimony whereof I affix my signature.

HENRIETTA H. ROWLAND,
*Administratrix of the estate of Henry A. Rowland, deceased.*

In presence of—
J. H. KNOWLES,
ANNIE MCFARLAND.